Patented May 26, 1942

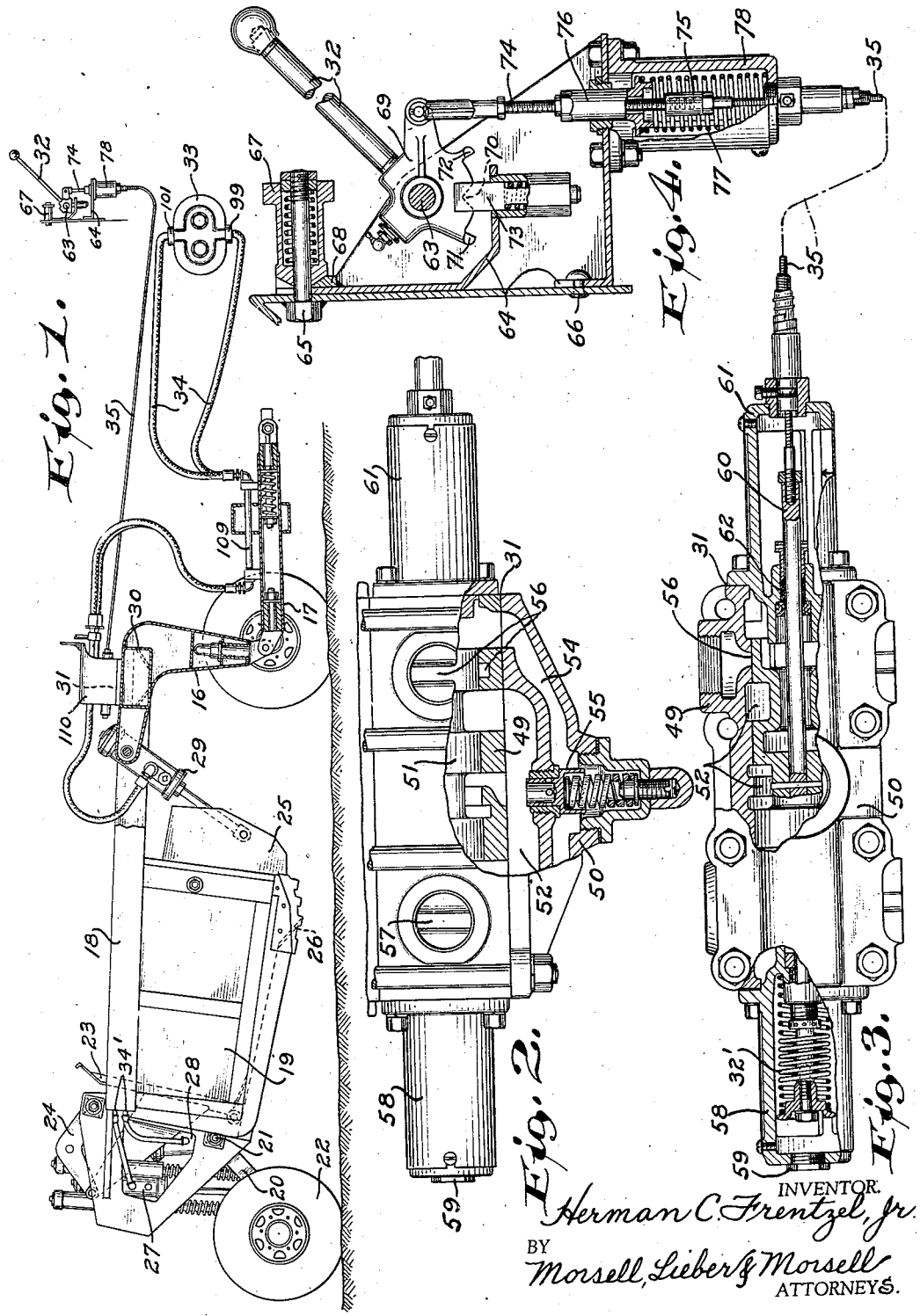

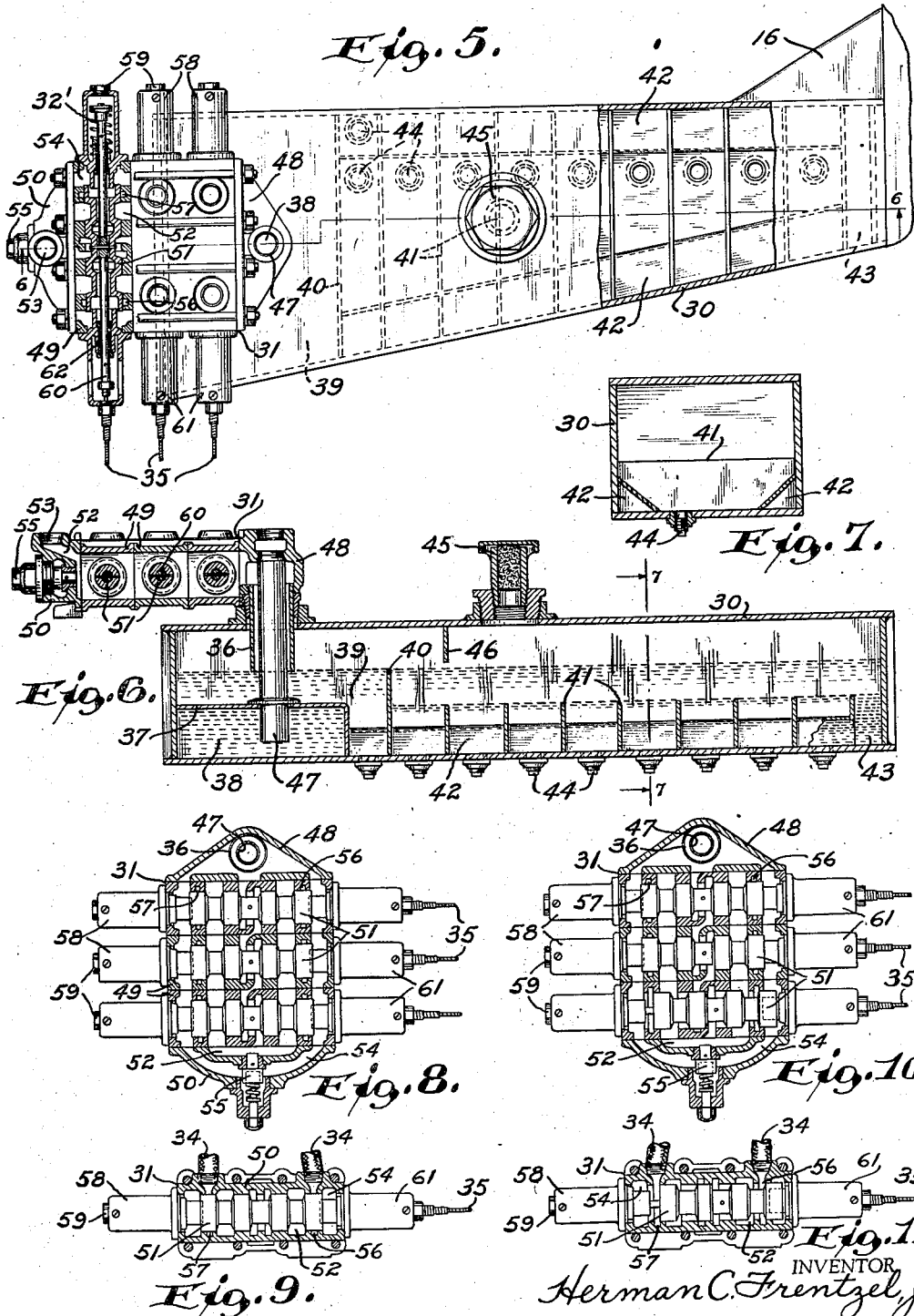

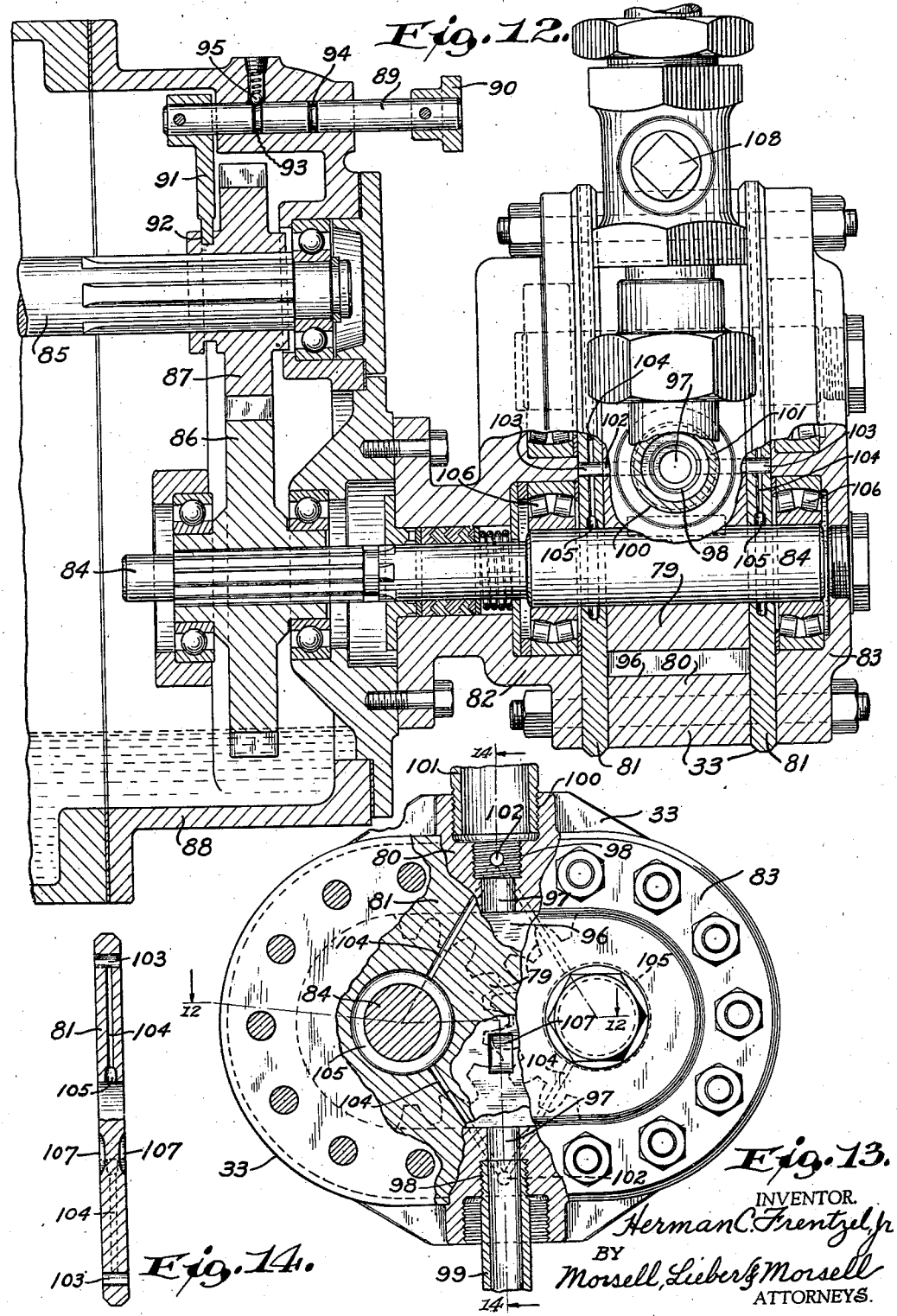

2,284,413

UNITED STATES PATENT OFFICE 2,284,413

HYDRAULIC SYSTEM

Herman C. Frentzel, Jr., Milwaukee, Wis., assignor to The Heil Co., Milwaukee, Wis., a corporation of Wisconsin Application July 20, 1938, Serial No. 220,215

1 Claim. (Cl. 210—60)

My present invention relates in general to improvements in the art of hydraulically actuating diverse mechanisms associated with a vehicle and for effecting control of the operation of such mechanisms from a remote station, and relates more specifically to improvements in the construction and operation of hydraulic systems for actuating and controlling devices such as excavating and dirt scraping assemblages.

Generally defined, an object of my present invention is to provide an improved hydraulic control and actuating system for vehicular structures such as road scrapers, which is highly reliable and efficient in operation.

It has heretofore been common commercial practice as shown and described in copending application Serial No. 150,232, filed June 25, 1937, now Patent No. 2,169,946, to elevate the load carrying bowl, and to actuate the front and rear aprons, of a tractor drawn scraper, with the aid of hydraulic jacks or hoists which are controllable from a remote station disposed upon the traction vehicle. Such control and actuating systems must not only be rapid and positive in action, but they must also be easily manipulable and dependable in operation. Due to the fact that such hydraulic systems are constantly exposed to severe and adverse conditions of operation, it has heretofore been difficult to insure efficient functioning thereof by preventing dust and grit from fouling the actuating liquid and from thus clogging and scoring the valves, cylinders and pumps. The prior systems were moreover sluggish in action and relatively complicated in structure, thereby requiring considerable and expert attention to maintain the same in efficient operating condition; and for these reasons many of the previous hydraulic control systems for apparatus of this kind, have been replaced by less efficient but relatively simple and dependable mechanical systems such as cables coacting with pulleys or sheaves.

The present invention therefore contemplates the provision of various improvements in the details of construction and operation of hydraulic control and actuating systems for scraper assemblages, whereby such systems may be made extremely durable and reliable in operation, and rapid and positive in action, regardless of the adverse nature of the operating conditions.

One of the more specific objects of my invention is to provide a simple, compact and efficient control valve assemblage, the several valves of which are quickly, easily, and conveniently manipulable from the tractor driver's seat.

Another specific object of the invention is to provide simple and automatically functioning instrumentalities for constantly removing impurities from the liquid of a hydraulic control system, and for maintaining this liquid clean.

A further specific object of the present invention is to provide an improved pump for circulating liquid such as oil through a hydraulic control and actuating system for devices such as power operated scrapers.

Still another specific object of my present invention is to provide an improved scraper control system wherein the control valves are disposed upon the scraper in close proximity to the liquid supply reservoir and hydraulic jacks, while the valve manipulating levers are conveniently accessible from the driver's seat of the tractor; and in which the scraper may be readily attached to or disconnected from the traction vehicle.

An additional specific object of my invention is to provide a relatively simple but very reliable and durable scraper actuating assemblage of the hydraulic type, which is well protected against damage and which may be readily maintained in most efficient operating condition.

These and other specific objects and advantages of my invention will be apparent from the following detailed description.

A clear conception of the nature of my invention, and of the construction and operation of hydraulic control systems for scrapers, built in accordance with the improvement, may be had by referring to the drawings accompanying and forming a part of this specification wherein like reference characters designate the same or similar parts in the various views.

Fig. 1 is a somewhat diagrammatic part sectional side elevation of a dig and carry scraper assemblage having one of the improved hydraulic control systems associated therewith, and showing the control levers and the circulating pump which are normally mounted upon the traction vehicle;

Fig. 2 is an enlarged part sectional side view of one of the control valves of the hydraulic system;

Fig. 3 is a similarly enlarged part sectional top view of the control valve of Fig. 2, showing the actuating cable thereof in dot-and-dash line;

Fig. 4 is a likewise enlarged part sectional side view of the manipulating lever assemblage which is ordinarily mounted upon the hauling tractor, showing the motion transmitting cable in dot-and-dash lines connected to the valve of Fig. 3;

Fig. 5 is a part sectional and somewhat enlarged, top view of the complete valve assemblage and of the liquid clarifying and supply reservoir formed in the scraper frame;

Fig. 6 is a section through the control valves and reservoir, taken along the irregular line 6—6 of Fig. 5;

Fig. 7 is a transverse vertical section through the liquid supply reservoir, taken along the line 7—7 of Fig. 6;

Fig. 8 is a somewhat diagrammatic central horizontal section through the control valve casing, showing all of the valves in neutral position;

Fig. 9 is a vertical section through the casing taken centrally of one of the control valves and showing the valve in neutral position;

Fig. 10 is a sectional view similar to that of Fig. 8, but showing one of the valves shifted out of neutral position;

Fig. 11 is another vertical section through the casing, similar to Fig. 9, but showing the valve shifted out of neutral position;

Fig. 12 is a considerably enlarged horizontal sectional view of the liquid circulating pump, the section being taken along the line 12—12 of Fig. 13;

Fig. 13 is a part sectional side elevation of the improved pump; and

Fig. 14 is a transverse vertical section through one of the end closures of the improved pump, the section being taken along the line 14—14 of Fig. 13.

While my invention has been shown herein as having been applied to a particular type of dig and carry scraper assemblage, it is not intended to thereby unnecessarily restrict the scope.

Referring especially to Fig. 1 of the drawings, the dirt moving scraper shown therein comprises in general main frame 16 pivotally supported at its front end upon a draft carriage 17 and having rearwardly extending laterally spaced hollow side arms 18 from which an open ended load receiving bowl 19 is rigidly suspended; an auxiliary frame 20 having its front end pivotally attached to the rear lower portion of the bowl 19 by means of a pivot shaft 21, while its rear end is swingably associated with the axle of the rear supporting wheels 22; a rear apron 23 disposed within and movable along the bowl 19 by means of lever arms 24 pivotally suspended from the rear upper portion of the main frame and bowl assemblage; a front apron 25 swingably suspended from the front medial portion of the bowl 19 and being movable toward and away from the cutting blade 26 which is carried by the front portion of the bowl bottom; independently functioning hydraulic jacks 27, 28, 29 for raising the bowl 19, and for operating the rear and front aprons 23, 25, respectively; and a hydraulic control and actuating system for the jacks 27, 28, 29 including a liquid supply reservoir 30 formed in the main frame 16, a series of control valves housed in a casing 31 carried by the main frame 16, a series of manually manipulable actuating levers 32 for the control valves, a liquid circulating pump 33, and liquid conductors or tubes 34 and motion transmitting cables 35 for effecting operation from a remote station such as the driver's seat of the propelling tractor which is attached to the draft carriage 17.

The general construction of the scraper constitutes no part of my present invention, and the several hydraulic hoists or jacks 27, 28, 29 are of relatively standard construction. The rear jack 27 may have its cylinder pivotally suspended by means of trunnions from the rear upper portion of the main frame 16, and its piston rod cooperable with the auxiliary frame 20 remote from the pivot shaft 21, in such manner that when this jack 27 is elongated the bowl 19 and blade 26 will be raised or elevated, whereas contraction of the jack 27 will cause the bowl and blade to descend. The intermediate jack 28 preferably has its cylinder swingably suspended from the pivot shaft 21, and its piston rod pivotally attached to the medial portions of the lever arms 24, in a manner to cause the rear apron 23 to move forwardly within the bowl 19 when the jack 28 is contracted, and to move the apron rearwardly upon elongation of this jack. The front jack 29 has its cylinder swingably suspended from the front portion of the main frame 16, and its piston rod pivotally attached to the front apron 25 so that elongation of the jack 29 will move the apron 25 toward the blade 26, whereas contraction of this front jack will elevate this apron.

In my present improved hydraulic control and actuating system, the jacks 27, 28, 29 are not the only elements which are carried directly by the scraper assemblage, but the main frame 16 is preferably specially constructed to provide a support for the supply reservoir 30, the control valves and most of the liquid conducting tubes 34, and these elements are thoroughly protected from dirt and possible damage. The improved liquid supply and clarifying assemblage is shown in detail in Figs. 5, 6 and 7, and comprises in general the storage reservoir 30 formed directly within the upper front cross-beam of the main frame 16; a pipe or tubular inlet 36 depending into one end of the reservoir 30 above a partition 37 which forms an outlet chamber 38 and a liquid receiving well 39 segregated from the chamber 38; a relatively high dam 40 and a succession of lower weirs 41 spanning the lower portion of the reservoir 30 remote from the well 39; opposite side conduits 42 connecting the chamber 38 with a well 43 formed adjacent the last weir 41; a series of drain plugs 44 associated with the reservoir 30 at the well 39 and between the successive weirs 41; a venting device 45 communicating with the reservoir 30 above the weirs 41; a baffle wall 46 depending from the top of the reservoir 30 between the vent 45 and the dam 40; and a liquid outlet or discharge pipe 47 extending upwardly from the lower portion of the chamber 38 through the inlet pipe 36. The pipes 36, 47 are detachably secured to one of the end heads 48 of the control valve casing 31, and this casing has three similar intermediate sections 49 and an opposite end section 40, all of which are firmly interconnected to form the casing 31 which is mounted directly upon the main scraper frame 16.

The details of construction of the improved control valve assemblage are best shown in Figs. 2, 3, 8, 9, 10 and 11, from which it will be apparent that each section 49 of the valve casing 31, is provided with a central horizontal through bore within which is located a piston valve 51. Each of the valves 51 is adapted to control the flow of liquid to and from one of the jacks 27, 28, 29, and the valves 51 are all identical in construction and are independently manipulable by means of three similar manipulating levers 32 which are connected to their respective valves 51 by the flexible cables 35, and by compression springs 32' coacting with the ends of the valves remote from the cables 35. The interior of the valve casing is provided with a pressure chamber 52 which constantly communicates through an opening 53 in the head 50, with the outlet or pressure side of the pump 33; and which, with the valves 51 all in neutral position, also communicates with the pipe 36 through the opposite end head 48 in the casing 31, as shown in Fig. 6. The valve casing 31 is also provided with an exhaust chamber 54 which is communicable with the chamber 52 past a spring pressed relief valve 55, and which is constantly in open communication with the pipe 36 through the head 48, regardless of the position of the valves 51. The interior of the casing 31 is moreover provided with a series of high pressure ports 56 and with a similar series of exhaust ports 57, one of each of which is communicable with one of the jacks 27, 28, 29; so that if one of the control valves 51 is pulled forwardly from neutral position as shown at the bottom of Fig. 10, the corresponding jack 27, 28 or 29 will have one of its displacement chambers connnected to pressure and the other to exhaust, whereas movement of the valve 51 rearwardly from neutral by the corresponding spring 32' will connect the first mentioned displacement chamber of the jack to exhaust and the other to pressure. The valves 51 are completely balanced as to liquid pressures acting thereon, and the springs 32' which are adjustable in strength, are enclosed within housings 58 and may be adjusted with the aid of a socket wrench applicable through openings in these housings which are normally sealed by plugs 59, see Fig. 3. The cables 35 are adjustably attached to the valves 51 through valve stems 60 which slidably coact with other housing 61, and all of the housings 58, 61 are provided with packings 62 adjacent the ends of the valves 51. It should be noted, that in this improved valve assemblage, the individual valves 51 are movable forwardly by tension or pull on the actuating cables 35, and are movable in the opposite direction by the expansion of the corresponding springs 32', so that the cables 35 always remain in tension and are never subjected to compression tending to destroy the tautness thereof, and to make them sag.

The manipulating lever assemblage which is mounted upon the tractor together with the pump 33, is shown in detail in Fig. 4, and comprises the three levers 32 which are mounted for oscillation upon a pivot shaft 63 supported upon a bracket 64. The bracket 64 may be supported upon the tractor preferably within easy reach from the driver's seat, at any desired angle; and has upper and lower slotted portions which coact respectively with an upper clamping bolt 65 and with lower positioning rivets 66. A spring pressed retaining latch 67 associated with the bolt 65, normally coacts with a socket 68 to hold the bracket 64 in position, but the bracket may be quickly removed by merely releasing the latch 67. The levers 32 are provided at their outer ends with suitable grip knobs, and have their inner ends provided with bearing portions 69 having notches 70 therein and limit stops 71, 72 spaced from the notches 70. Reciprocable spring pressed latches 73 which are carried by the frame 64, are adapted to coact with the V-notches 70 of the respective levers 32 to hold them in neutral position, and the limit stops 71, 72 are adapted to engage the latches 73 when the levers 32 are thrown in either of their extreme positions. Each of the bearing portions 69 is attached to one of the cables 35 by means of an adjustable link 74 coacting with an adjusting collar 75 so as to permit slack in the corresponding cable 32 to be taken up, and the links 74 are provided with adjustable abutments 76 with which coil springs 77 coact. The springs 77 are housed within and react against casings 78 secured to the bracket 64, and the assemblage is such that the springs 77 maintain the cables 35 taut at all times when the collars 75 and the abutments 76 have been properly adjusted. The manipulating lever assemblage may obviously be applied to or removed from its support, as a unit, and the several levers 32 are preferably positioned closely adjacent each other.

The improved liquid circulating pump 33 for delivering liquid under pressure from the reservoir 30 to the several hydraulic jacks 27, 28, 29 is preferably operable by the motor which propels the tractor, and should therefore be mounted upon the traction vehicle near the levers 32. The pump 33 is shown in detail in Figs. 12, 13 and 14, and is of the gear type comprising intermeshing gear rotors 79 rotatable within a casing 80, the opposite sides of which are provided with similar sealing plates 81 and with outer heads 82, 83 coacting with the plates 81. One of the rotors 79 is mounted upon a driving shaft 84 which is drivingly connected to a power take-off shaft 85 as shown in Fig. 12, by means of a gear 86 fixedly mounted upon the pump shaft 84 and meshing with a gear 87 which is slidably splined to the shaft 85. The shafts 84, 85 are journalled for rotation in anti-friction bearings carried by the tractor casing 88, and the gear 87 may be moved into and out of mesh with the gear 86 by means of a shifter rod 89 slidably supported in the casing 88 and having at one end an actuating button or knob 90, and at its opposite end a bracket 91 coacting with an annular groove 92 formed in the hub of the gear 87. The medial portion of the shifter rod 89 is provided with spaced grooves 93, 94 with which a ball latch 95 is cooperable to position the gear 87 either in active or inactive position.

While the pump 33 when properly assembled and installed, is operable in one direction only, it may be installed for rotation in either direction, or with the inlet and outlet connections communicating with either end thereof, by virtue of the improved formation of the casing 80 and of the side plates 81. The casing 80 is provided with a displacement chamber 96 within which the gear rotors 79 are operable, and the chamber 96 has alined ports 97 in constant communication therewith. Directly adjoining each port 97 is a threaded socket 98 adapted for the reception of a liquid outlet or discharge pipe 99, and directly adjacent each socket 98 is a larger threaded socket 100 adapted for similar reception of a liquid inlet or suction pipe 101. Communicating laterally with each of the sockets 98, is a pair of opposite alined ports 102, one set of which is open to the suction side of the pump while the other set is sealed by the insertion of the discharge pipe 99 as clearly indicated in Fig. 13, and the ports 102 are in open communication with openings 103 in the adjacent side plates 81. The openings 103 are connected by passages 104 with annular sealing chambers 105 all formed in the plates 81, and the chambers 105 surround the shafts 84 and are at all times connected to the pump suction, thereby returning leakage liquid which escapes from the chamber 96 to the pump and preventing such liquid from escaping the pump bearings 106. Each of the side plates 81 is also provided with opposite side detents 107 shown in Figs. 13 and 14, which form recesses at the opposite ends of the intermeshing teeth of the rotors 79 and thereby prevent the rotors from becoming locked due to the confinement of high pressure liquid therebetween; and by providing four of these detents 107 on each plate 81 and by making the plates symmetrical and reversible, one set of the recesses 107 will be effective regardless of the mode of assembly or of the direction of rotation of the pump rotors 79. The suction pipe 101 of the pump 33 is normally connected with the liquid supply pipe 47 through the valve casing end head 48 and one of the flexible conducting pipes 34, and the discharge pipe 99 is connected to the port 53 of the opposite casing end head 50 through another of the pipes 34, and the pump 33 may be provided with a shut-off valve 108 for disconnecting the pump from the hydraulic system. The pipes 34 may also be provided with a rigid section 109 supported upon the carriage 17, in order to prevent these pipes from being damaged by the tractor, and the pipes 34' leading from the valve casing 31 to the rear and intermediate jacks 27, 28 are preferably confined within the side arms 18 of the main frame 16. The valve casing 31 is also preferably covered and protected by a shield 110 as shown in Fig. 1.

When the improved hydraulic system has been properly installed upon a scraper assemblage and tractor and has been supplied with sufficient actuating liquid such as oil, the pump 33 may be connected to or disconnected from the power take-off shaft 85 of the tractor at the will of the driver of the traction vehicle and with the aid of the shifter actuating knob 90. As shown in Fig. 12, the pump 33 is in operation, and motion is being transmitted thereto from the shaft 85 through the gears 87, 86 to the pump shaft 84, and the gear rotors 79 are revolving downwardly toward the discharge pipe 99 as viewed in Fig. 13. The pump 33 is then withdrawing liquid from the reservoir 30 through the chamber 38, pipe 47, valve casing head 48, suction pipe 34 and inlet pipe 101, and is forcing the liquid under pressure through the discharge pipe 99, pressure pipe 34, and port 53 into the high pressure chamber 52 of the valve casing 31. When the gear 87 is shifted along the shaft 85 to cause the latch 95 to engage the groove 94, the pump 33 will stop and the circulation of liquid will naturally cease, or the circulation may also be stopped by closing the valve 108. During such normal operation of the pump 33, any liquid which escapes from the pump displacement chamber 96 past the shafts 84, will enter the chambers 105 in the side plates 81, and since these chambers 105 are all connected to the suction side of the pump through the passages 104, openings 103 and ports 102 adjacent the inlet pipe 101, the leakage liquid will return to the circulating system without entering the bearings 106 or escaping to the exterior. The chambers 105 and passages 104 obviously avoid placing the bearings 106 in the circulating system, and thus protects the bearings from entry of dirt or grit.

With the pump 33 operating normally, if all of the jack control valves 51 are in central or neutral position as shown in Fig. 8, all of the liquid delivered to the chamber 52 through the port 53 is free to escape past the central portions of the valves 51 to the return pipe 31 of the reservoir 30, and is delivered into the well 39. As this liquid accumulates in the well 39, it eventually flows over the crest of the dam 40 and over the tops of the weirs 41 and returns to the chamber 38 through the end well 43 and conduits 42. This return of the liquid through the basin above the weirs 41 is very slow, and any heavy impurities will naturally descend by gravity and will accumulate in the pockets between the successive weirs 41 from whence the impurities may be periodically removed by withdrawing the plugs 44. During normal operation, the oil level within the reservoir 30 should always be maintained above the crest of the dam 40, in order to avoid agitating the sediment in the pockets between the weirs 42. The vent 45 prevents pressure from building up in the interior of the reservoir 30 while at the same time preventing ingress of dust, and when none of the jacks 27, 28, 29 are in operation, the pump 33 is practically relieved of pressure except as required to circulate the liquid through the valve casing 31, reservoir 30 and conductor pipes 34.

As previously indicated, any of the jacks 27, 28, 29 may be operated independently of the others, and simultaneously therewith if so desired, by merely manipulating the lever 32 corresponding to the jack or jacks which is to be operated. When a lever 32 is swung from neutral position as shown in Fig. 4, to bring the stop 71 thereof into engagement with the latch 73, the corresponding valve 51 will be moved forwardly by a direct pull on the cable 35 thereof assisted by the spring 77, to the position shown in Fig. 11, thereby cutting off the free flow of liquid from the pressure chamber 52 to the reservoir 30, while at the same time connecting the port 56 to the high pressure chamber 52 and simultaneously connecting the port 57 with the lower pressure or exhaust chamber 54. The piston of the corresponding jack 27, 28, 29 will then be subjected to high pressure liquid on one side, and to exhaust on the other side, and will move in the desired direction. In order to return the jack piston to the initial position, it is only necessary to swing the corresponding control lever 32 in the opposite direction until the abutment stop 72 engages the latch 73, whereupon the corresponding valve 51 will be moved rearwardly by the action of the corresponding spring 32' until the port 56 is connected to the exhaust chamber 54 and the port 57 is connected to the pressure chamber 52. The piston of the jack will then be subjected to reverse pressure conditions, causing it to move in the opposite direction from that above described; and if it is desired to hold the jack in either of its extreme positions, it is only necessary to place the lever 32 in neutral position with the latch 32 in engagement with the notch 70 thereof. In the event that the pressure within the chamber 32 becomes excessive for any reason whatsover, the relief valve 55 will automatically operate to relieve the excessive pressure and to permit the liquid to escape to the low pressure chamber 54. In the event that one jack is being operated by manipulation of its corresponding valve 51, and it then becomes desirable to operate any of the other jacks, such operation may still be effected with the improved valve mechanism, since liquid under pressure may still be delivered from the chamber 52 of the valve casing 31 to such other jack. This will be clearly apparent from Fig. 10, wherein liquid under pressure may be delivered to either of the upper valves 51, regardless of the seating of the lower valve 51. It will thus be apparent that any one or more of the jacks 27, 28, 29 may be operated in either direction, either independently of or simultaneously with others, and the capacity of the pump 33 should of course be sufficient to take care of all of the jacks.

It is also to be observed that each of the valves 51 is completely balanced as to liquid pressures thereon, and that these valves may be operated in either direction without destroying the tautness of the cables 35. The valves 51 are movable in one direction by the pull on the corresponding levers 32 aided by the springs 77 and are movable in the opposite directions by means of the springs 32' which should be of sufficient strength to overcome the action of the springs 77. The various parts of the apparatus are susceptible of rapid and accurate adjustment so as to insure proper functioning thereof, and the clarifying apparatus disposed within the supply reservoir 30 will effectively remove objectionable impurities from the liquid without interrupting the operation of the hydraulic system.

From the foregoing specific description it will be apparent that my present invention provides an extremely simple, compact, and durable hydraulic system for effecting remote control and operation of a series of hydraulic jacks associated with a scraper. The major portion of the system is carried directly by the scraper itself, and merely the pump and control levers are located upon the traction vehicle. The pump and the control levers may, however, be conveniently applied to or removed from the traction vehicle, and all portions of the mechanism are effectively protected against possible damage due to normal use of the scraper assemblage. While I have shown only three control valves operating in conjunction with only three hydraulic jacks, the number of these devices may be increased or diminished as desired, by merely adding additional valve casing sections 49 and valves 51, together with control levers 32 for these additional valves. An important feature of the present invention is the mechanism for operating the valves with the aid of cables 35 which are constantly in tension. The improved control lever assembly is also important as is the specific construction of the valves themselves. The improved liquid clarifying apparatus associated with the supply reservoir 30 operates to effectively maintain the liquid in clean condition, thereby preventing possible scoring of the valves and jack cylinders, and the improved pump construction may be readily assembled and installed without danger of having the ports 102 improperly connected. It will be apparent that the pump may be operated in either direction, and the pipes 99, 101 may be connected to either side thereof, and the side plates 81 may be installed in any desired manner, without disturbing the efficiency of the pump. The improved construction of these side plates 81 with the conduits 105 and bleeder passages 104 which withdraw lubricant from the bearings 106 rather than permitting oil from the hydraulic system to enter these bearings, is very important, and it should be noted that this construction protects the bearings 106 against ingress of grit. The side plates 81 are of sufficient thickness to prevent deflection due to the hydraulic pressure in the circulating system, and wear on these plates is therefore reduced to a minimum. While the pump has been shown herein as being operable by the tractor propelling motor, a separate motor may also be used for propelling the pump, without departing from the present invention. The improved system has proven highly satisfactory and successful in actual commercial use, especially as applied to a road scraper of the type shown herein, and the system may obviously be furnished at moderate cost and is extremely reliable in actual operation. It has also been found desirable in order to prevent settling of the scraper bowl and due to the necessary clearance in the control valve 51 for the bowl elevating hoist or jack 27, to provide a check valve for positively retaining the hydraulic pressure in the cylinder of the jack 27 when its control valve is in neutral position. This check valve may be inserted in the return line for the jack 27 in advance of its control valve 51, and the check valve may be operable by high pressure fluid in the system so as to prevent oil from escaping from the jack cylinder when it is desired to retain the scraper bowl elevated.

It should be understood that it is not desired to limit this invention to the exact details of construction or to the precise mode of use herein shown and described, for various modifications within the scope of the claim, may occur to persons skilled in the art.

I claim:

A reservoir clarifying structure for a hydraulic system, comprising a receptacle having a separated inlet and an outlet, means within the receptacle forming receiving and outlet chambers, a relatively high dam and spaced lower weirs within the receiving chamber, and longitudinal partitions along opposite lower interior side portions of the receptacle providing conduits between the receiving and outlet chambers.

HERMAN C. FRENTZEL, Jr.